US007668848B2

(12) United States Patent
Burgan et al.

(10) Patent No.: US 7,668,848 B2
(45) Date of Patent: Feb. 23, 2010

(54) METHOD AND SYSTEM FOR SELECTIVELY DECODING AUDIO FILES IN AN ELECTRONIC DEVICE

(75) Inventors: John M. Burgan, North Palm Beach, FL (US); Edward A. Diaz, Miami, FL (US); Jose E. Korneluk, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 388 days.

(21) Appl. No.: 11/296,613

(22) Filed: Dec. 7, 2005

(65) Prior Publication Data

US 2007/0130187 A1 Jun. 7, 2007

(51) Int. Cl.
*G06F 17/00* (2006.01)

(52) U.S. Cl. ......................... 707/101; 700/94; 704/201; 704/205; 704/503; 318/22

(58) Field of Classification Search ................. 707/101; 704/201, 205, 503; 700/94; 318/22
See application file for complete search history.

(56) References Cited

U.S. PATENT DOCUMENTS

| | | | | |
|---|---|---|---|---|
| 5,367,301 | A * | 11/1994 | Stiltner et al. | 341/144 |
| 5,586,193 | A * | 12/1996 | Ichise et al. | 381/106 |
| 5,838,678 | A * | 11/1998 | Davis et al. | 370/389 |
| 5,881,245 | A * | 3/1999 | Thompson | 709/219 |
| 5,923,361 | A * | 7/1999 | Sutton, Jr. | 725/93 |
| 6,313,386 | B1 * | 11/2001 | Capobianco et al. | 84/600 |
| 6,788,982 | B1 | 9/2004 | Lapstun et al. | |
| 6,799,273 | B1 * | 9/2004 | Oishi et al. | 713/171 |
| 6,816,444 | B1 | 11/2004 | Hayakawa et al. | |
| 6,925,340 | B1 * | 8/2005 | Suito et al. | 700/94 |
| 6,985,783 | B2 * | 1/2006 | Li et al. | 700/94 |
| 2003/0023429 | A1 * | 1/2003 | Claesson et al. | 704/201 |
| 2003/0033449 | A1 * | 2/2003 | Frantz et al. | 710/1 |
| 2003/0060911 | A1 * | 3/2003 | Chan et al. | 700/94 |
| 2003/0158737 | A1 * | 8/2003 | Csicsatka | 704/273 |
| 2003/0171937 | A1 * | 9/2003 | Fukumoto | 704/503 |
| 2003/0187634 | A1 * | 10/2003 | Li | 704/200.1 |
| 2004/0083493 | A1 * | 4/2004 | Swisher et al. | 725/106 |
| 2004/0098739 | A1 * | 5/2004 | Rakib | 725/15 |
| 2004/0255322 | A1 * | 12/2004 | Meadows et al. | 725/23 |
| 2005/0053249 | A1 * | 3/2005 | Wu et al. | 381/310 |
| 2005/0102438 | A1 * | 5/2005 | Nakagawa | 710/1 |
| 2005/0107120 | A1 * | 5/2005 | Yueh | 455/557 |
| 2005/0171795 | A1 * | 8/2005 | Kearby et al. | 705/1 |
| 2005/0240414 | A1 * | 10/2005 | Tominaga | 704/500 |
| 2006/0052129 | A1 * | 3/2006 | Hong et al. | 455/550.1 |
| 2007/0155332 | A1 * | 7/2007 | Burgan et al. | 455/67.11 |

* cited by examiner

*Primary Examiner*—Jean B. Fleurantin
*Assistant Examiner*—Phong Nguyen
(74) *Attorney, Agent, or Firm*—Scott M. Garrett; Sylvia Chen

(57) ABSTRACT

A method and system for operating an electronic device (102) that is operably coupled to an audio output device (104) is provided. The method includes receiving an encoded audio file at the electronic device. Further, the method includes selectively decoding (202) the encoded audio file, in correspondence with a spectral response of the audio output device, to provide decoded audio data. Furthermore, the method includes playing (204) the decoded audio data over the audio output device.

11 Claims, 4 Drawing Sheets

METHOD AND SYSTEM FOR SELECTIVELY DECODING AUDIO FILES IN AN ELECTRONIC DEVICE

FIELD OF THE INVENTION

This invention relates in general to electronic devices, and more specifically, to a method and system for improving an electronic circuit.

BACKGROUND OF THE INVENTION

Electronic devices are used to perform a wide variety of functions. For example, they can be used to play games, play encoded audio files, browse the Internet, and send messages. Examples of electronic devices include, but are not limited to, mobile phones, laptops, palmtops, personal digital assistants (PDAs), and portable music players. One of the areas of growth in electronic devices is related to their capability to play different types of encoded audio files. The encoded audio files have to be decoded before they can be played on the electronic devices. Examples of encoded audio files include, but are not limited to, Motion Picture Experts Group (MPEG) layer 3 (MP3P) files, Advanced Audio Coding (AAC) files, Advanced Audio Coding plus (AAC+) files, Window Media Audio (WMA) files, Waveform Audio (WAV) files, Musical Instrument Digital Interface (MIDI) files, and Ogg vorbis files.

There are various audio file decoders available for decoding encoded audio files. Broadly, audio file decoders can be categorized into hardware audio file decoders and software audio file decoders. Hardware audio file decoders are expensive when compared to software audio file decoders. In addition, hardware audio file decoders consume a lot of space in electronic devices. Conversely, software audio file decoders are relatively less expensive, compared to hardware audio file decoders.

However, software audio file decoders also have their disadvantages. Firstly, they require intensive computation, as a result of which they consume a lot of power. Secondly, they emit more Electromagnetic Interference (EMI) as compared to hardware audio file decoders.

Further, hardware and software decoders decode audio files, independent of the capabilities of an audio output device, to play decoded audio files. Consequently, information in the audio files which cannot be played over the audio output device is also decoded.

BRIEF DESCRIPTION OF THE FIGURES

The present invention is illustrated by way of example and not limitation in the accompanying figures, in which like references indicate similar elements, and in which.

Figure 1:
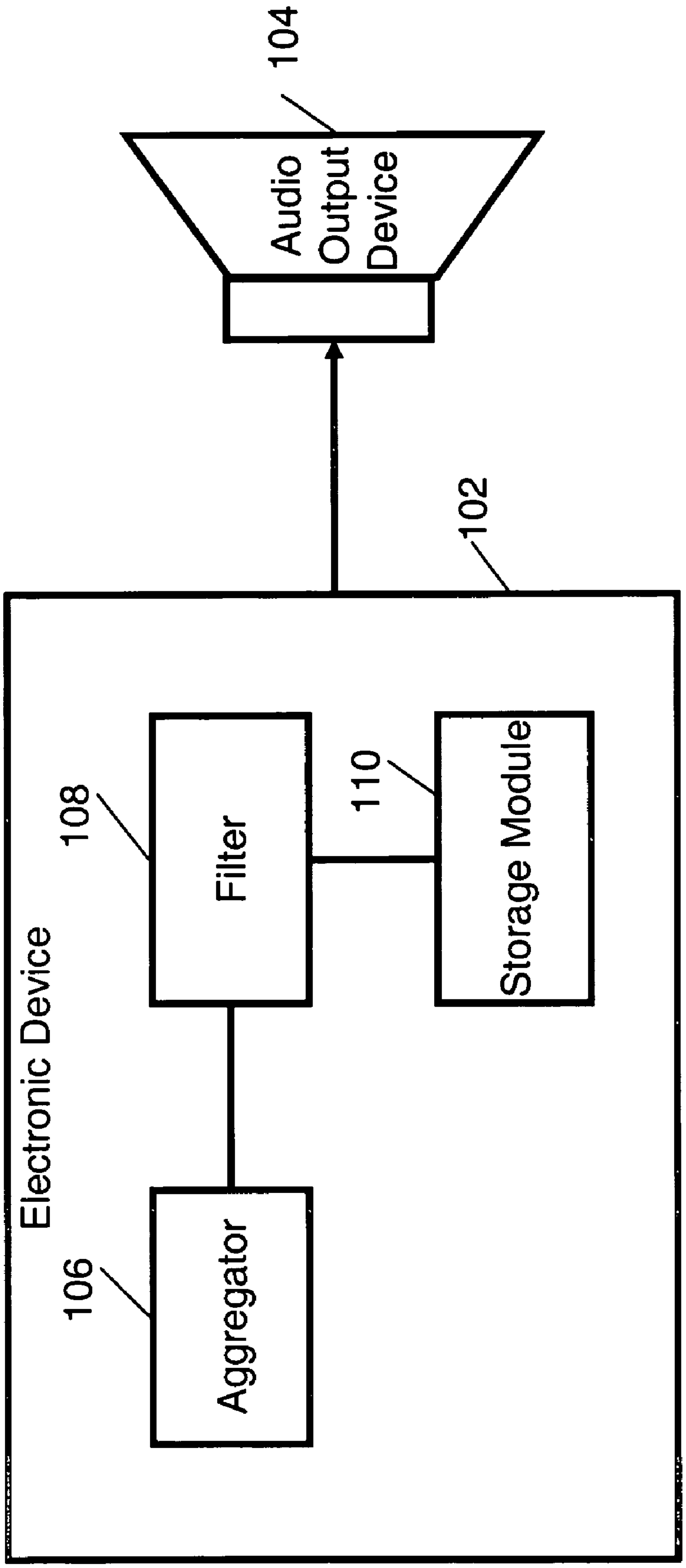
FIG. 1 illustrates an electronic device, in accordance with various embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements, to help to improve understanding of embodiments of the present invention.

DETAILED DESCRIPTION OF THE EMBODIMENTS

Before describing in detail the particular method and system for operating an electronic device in accordance with the present invention, it should be observed that the present invention resides primarily in combinations of method steps and apparatus components related to method and system for operating an electronic device. Accordingly, the apparatus components and method steps have been represented where appropriate by conventional symbols in the drawings, showing only those specific details that are pertinent to understanding the present invention, so as not to obscure the disclosure with details that will be readily apparent to those of ordinary skill in the art having the benefit of the description herein.

The terms such as “comprises,” “comprising”, “includes”, “including”, or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises . . . a” does not, without more constraints, preclude the existence of additional identical elements in the process, method, article, or apparatus that comprises the element. The term “another”, as used herein, is defined as at least a second or more. The terms “including” and/or “having”, as used herein, are defined as comprising. The term “coupled”, as used herein with reference to electro-optical technology, is defined as connected, although not necessarily directly, and not necessarily mechanically. The term “program”, as used herein, is defined as a sequence of instructions designed for execution on a computer system. A “program”, or “computer program”, may include a subroutine, a function, a procedure, an object method, an object implementation, an executable application, an applet, a servlet, a source code, an object code, a shared library/dynamic load library and/or other sequence of instructions designed for execution on a computer system.

In an embodiment of the present invention, a method of operating an electronic device coupled to an audio output device is provided. The audio output device has a spectral response. The electronic device receives an encoded audio file. After the encoded audio file is received, it is selectively decoded in correspondence with the spectral response of the audio output device. The encoded audio file is selectively decoded to provide decoded audio data. Further, the decoded audio data is played over the audio output device.

In another embodiment of the present invention, an electronic device is provided. The electronic device includes an aggregator and a filter. The aggregator combines a plurality of channels in a frequency spectrum of an encoded audio file into a single channel, to generate decoded audio data. The output of the aggregator is provided to the filter, which limits the decoded audio data to one or more frequency bands in the frequency spectrum of the encoded audio file.

FIG. 1 illustrates an electronic device 102, in accordance with various embodiments of the present invention. The electronic device 102 is operably coupled to an audio output device 104. The electronic device 102 receives an encoded audio file. The electronic device 102 includes an aggregator 106, and a filter 108. Examples of the electronic device 102 include, but are not limited to, mobile phones, laptops, palmtops, personal digital assistants (PDAs), and portable audio players. The aggregator 106 combines a plurality of channels in a frequency spectrum of the encoded audio file into a single channel, to generate decoded audio data. The decoded audio data with the single channel is then passed to the filter 108. The filter 108 limits the single channel in the decoded audio data to one or more frequency bands in the frequency spectrum of the encoded audio file. In an embodiment of the present invention, the filter 108 limits the single channel in the decoded audio data to the one or more frequency bands in the frequency spectrum of the encoded audio file based on the configuration parameters of the audio output device 104. The configuration parameters of the audio output device 104 are stored in a storage module 110 of the electronic device 102. After the decoded audio data is filtered, it is decoded for the one or more frequency bands and passed to the audio output device 104, which then produces a desired output.

Figure 2:
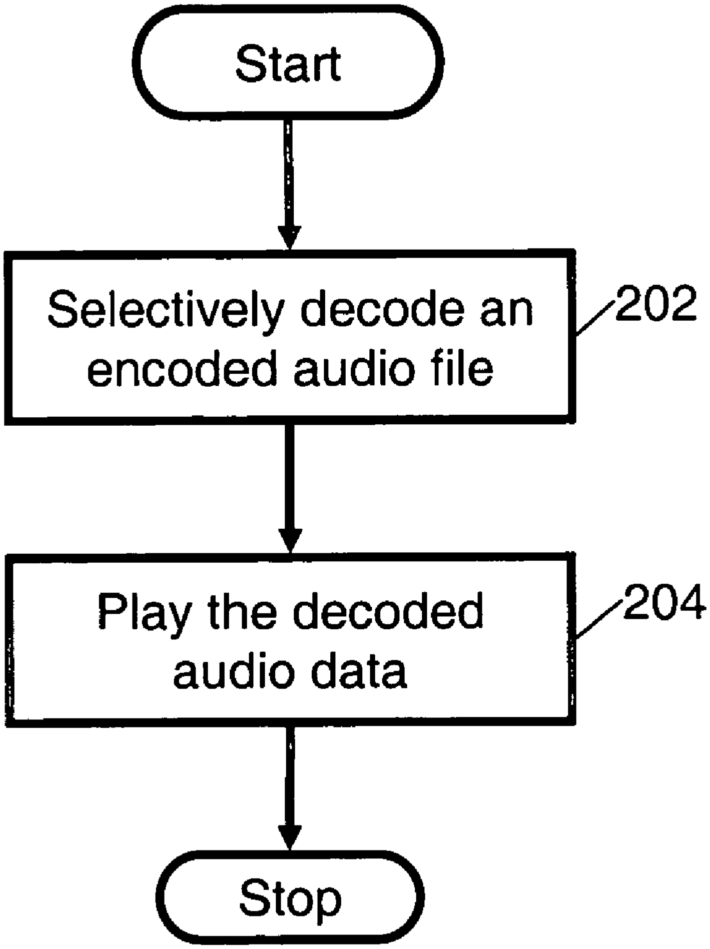
FIG. 2 is a flowchart illustrating a method of operating an electronic device, in accordance with an embodiment of the present invention.

FIG. 2 is a flowchart illustrating a method of operating the electronic device 102, in accordance with an embodiment of the present invention. At step 202, an encoded audio file is selectively decoded. Examples of the encoded audio file include, but are not limited to, a Motion Picture Experts Group (MPEG) layer 3 (MP3P) file, an Advanced Audio Coding (AAC) file, an Advanced Audio Coding plus (AAC+) file, a Window Media Audio (WMA) file, a Waveform Audio (WAV) file, and an Ogg vorbis file. The encoded audio file is selectively decoded in correspondence with a spectral response of the audio output device 104. In an embodiment of the present invention, configuration parameters the audio output device 104 are obtained from the storage module 110. Examples of the configuration parameters include, but are not limited to, frequency bands supported, monophonic, stereophonic, or polyphonic capabilities of the audio output device 104. Further, parameters of a decoder in the electronic device 102 are adjusted to match the configuration parameters of the audio output device 104. In another embodiment of the present invention, the encoded audio file is selectively decoded by limiting the decoded audio data to one or more frequency bands in a frequency spectrum of the encoded audio file. Then the encoded audio file is decoded for the one or more frequency bands. The filter 108 limits the decoded audio data to the one or more frequency bands in the frequency spectrum of the encoded audio file.

In an embodiment of the present invention, the decoded audio data is stored in a predefined format in, for example, the storage module 110. Examples of the predefined format include, but are not limited to, a Motion Picture Experts Group (MPEG) layer 3 (MP3) file, an Advanced Audio Coding (AAC) file, an Advanced Audio Coding plus (AAC+) file, a Window Media Audio (WMA) file, a Waveform Audio (WAV) file, a Musical Instrument Digital Interface (MIDI) file, and an Ogg vorbis file. In this embodiment, the decoded audio data stored in the storage module 110 can be provided to the audio output device 104. In an embodiment of the present invention, the decoded audio data is stored in a format, which is different from the format of the encoded audio file. For example, if the encoded audio file is in the MP3 format the decoded audio data is stored in the WAV format.

At step 204, the decoded audio data is played over the audio output device 104. In an embodiment of the present invention, the electronic device 102 can operated in either a power-saving mode or a performance mode. In the power-saving mode, the encoded audio file is selectively decoded to reduce the processing power and the number of instructions (referred to as Million Instructions per Second (MIPS)) used in decoding the encoded audio file. In the performance mode, the complete frequency spectrum of the encoded audio file is decoded.

Figure 3:
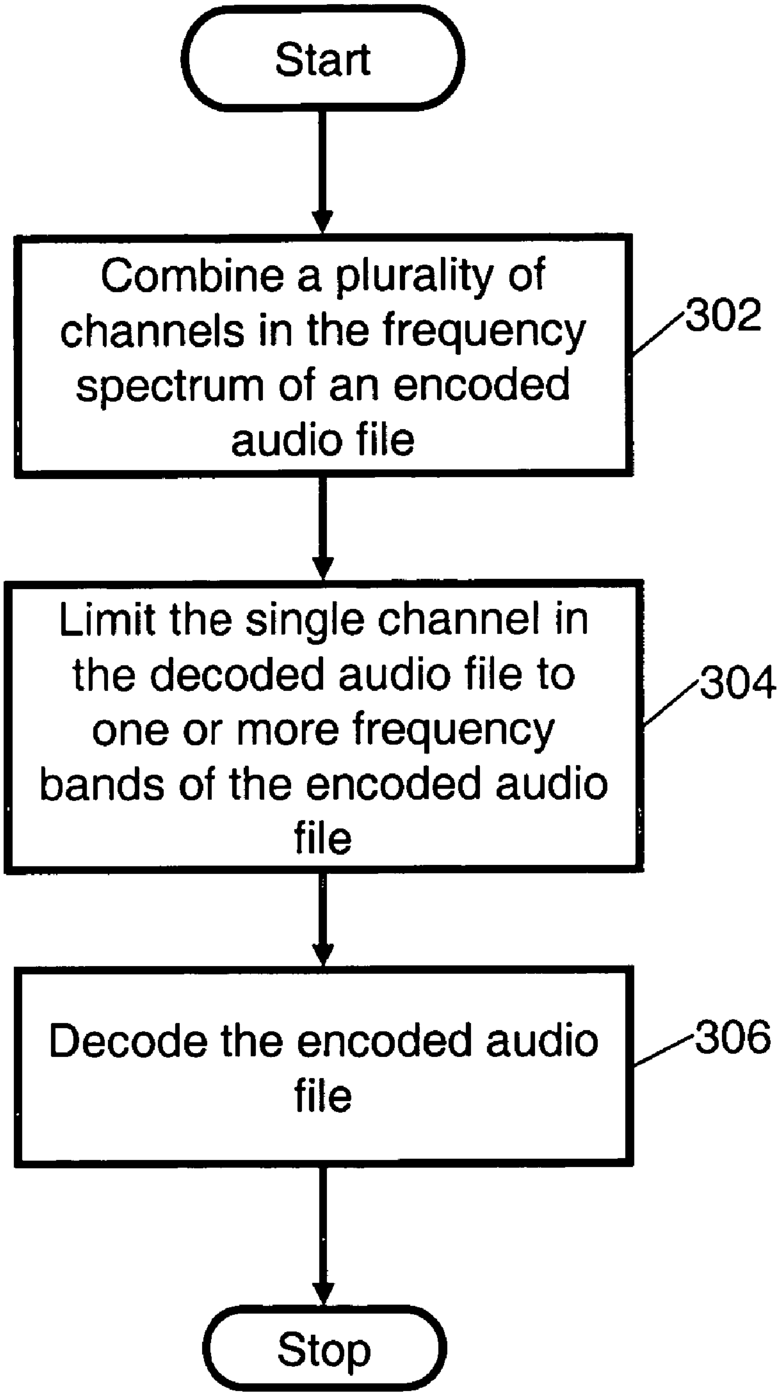
FIG. 3 is a flowchart illustrating a method of operating an electronic device, in accordance with another embodiment of the present invention.

FIG. 3 is a flowchart illustrating a method of operating the electronic device 102, in accordance with another embodiment of the present invention. At step 302, a plurality of channels in a frequency spectrum of an encoded audio file is combined into a single channel, to generate decoded audio data. At step 304, the single channel in the decoded audio data is limited to one or more frequency bands in the frequency spectrum of the encoded audio file. In an embodiment of the present invention, the single channel in the decoded audio data is limited to the one or more frequency bands, based on the configuration parameters of the audio output device 104. At step 306, the encoded audio file is decoded for the one or more frequency bands. In an embodiment of the present invention, the decoded audio data is stored in a predefined format in, for example, the storage module 110. In this embodiment, the decoded audio data stored in the storage module 110 can be provided to the audio output device 104.

Figure 4:
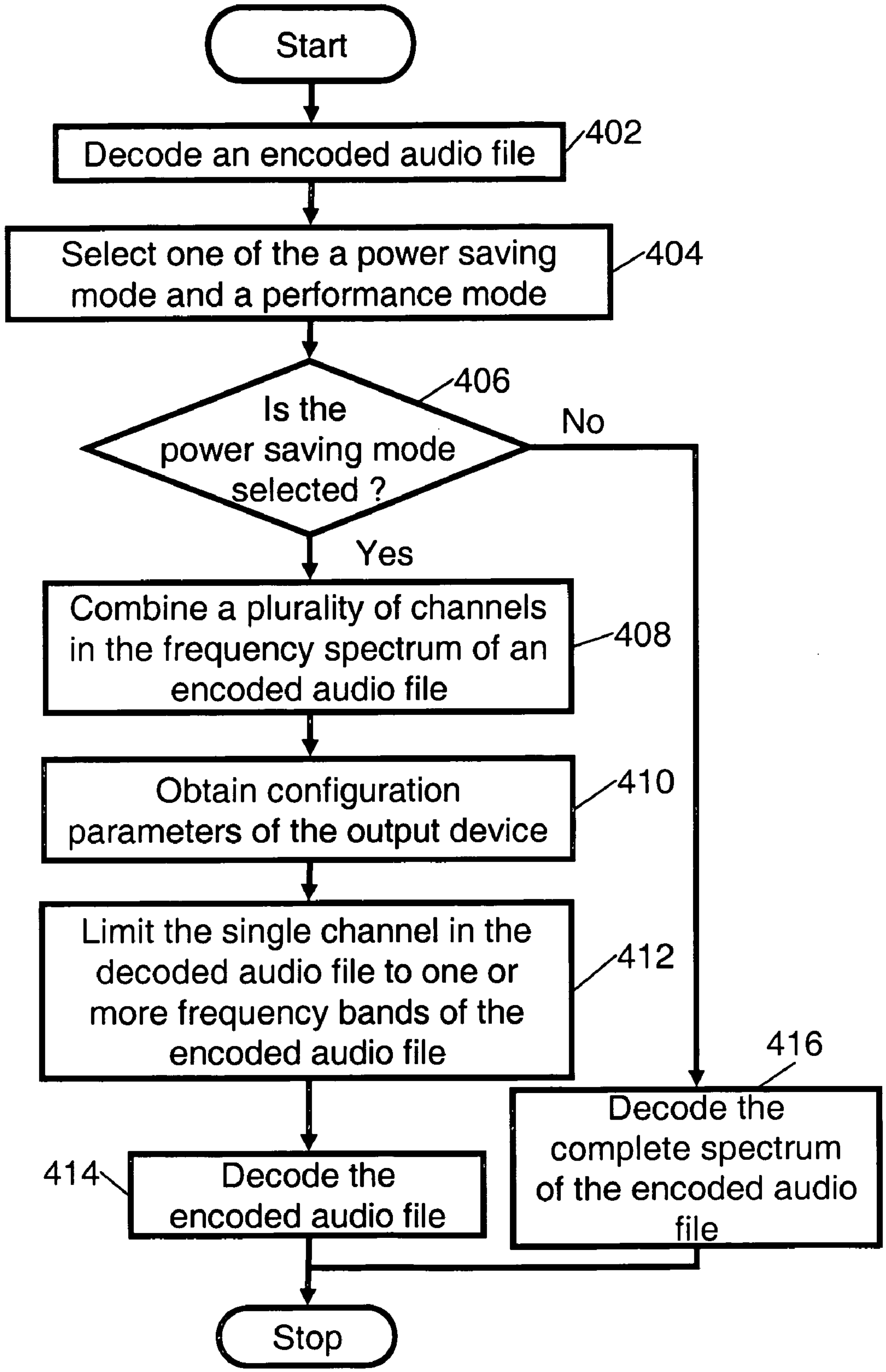
FIG. 4 is a flowchart illustrating a method of operating an electronic device, in accordance with yet another embodiment of the present invention.

FIG. 4 is a flowchart illustrating a method of operating the electronic device 102, in accordance with yet another embodiment of the present invention. At step 402, an encoded audio file is decoded. The encoded audio file is decoded to reduce the redundant information present in it. At step 404, either a power-saving mode or a performance mode is selected. At step 406, it is determined whether a power-saving mode has been selected.

If it is determined at step 406 that the power-saving mode has been selected, then, at step 408, a plurality of channels in a frequency spectrum of the encoded audio file are combined into a single channel, to generate decoded audio data. In an embodiment of the present invention, the aggregator 106 combines the plurality of channels in the frequency spectrum of the encoded audio file. In another embodiment of the present invention, the plurality of channels in the encoded audio file are combined into a single channel to reduce the required processing power. In yet another embodiment of the present invention, the plurality of channels in the encoded audio file are combined into a single channel as the audio output device 104 may be capable of playing only a monophonic audio file. At step 410, configuration parameters of the audio output device 104 that is operably coupled to the electronic device 102 are obtained. In an embodiment of the present invention, the configuration parameters are obtained from the storage module 110 of the electronic device 102. At step 412, the single channel in the decoded audio data is limited to one or more frequency bands in a frequency spectrum of the encoded audio file, based on the configuration parameters of the audio output device 104. At step 414, the encoded audio file is decoded, for the one or more bands in the frequency spectrum of the encoded audio file. In an embodiment of the present invention, the decoded audio data is stored in a predefined format in the storage module 110. In this embodiment, the decoded audio data stored in the storage module 110 can be provided to the audio output device 104. If at step 404, performance mode is selected, then at step 416 the complete spectrum of the encoded audio file is decoded.

Various embodiments of the present invention provide a method and system for operating the electronic device 102. The electronic device 102 is operated by selectively decoding an audio file. The audio file is selectively decoded, since only one or more frequency bands in the frequency spectrum of the encoded audio file is decoded.

Various embodiments of the present invention provide a method of and system for reducing the processing power needed to decode an encoded audio file. In an embodiment of the invention, combining a plurality of channels in the encoded audio file to a single channel can reduce the required processing power to approximately half of the original processing power. Similarly, limiting the single channel to one or more frequency bands reduces the required processing power proportionally to the reduction in frequency bands. A combination of the above-mentioned steps can further reduce the required processing power. The reduction in processing power allows processor clocks to run at lower frequencies which in turn reduces the Electromagnetic Interference (EMI).

Moreover, an embodiment can be implemented as a computer usable medium having computer readable program code stored thereon for programming a computer (e.g., comprising a processor) to perform a method as described and claimed herein.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of operating an electronic device, the electronic device receiving an encoded audio file, the electronic device operably coupled to an audio output device having a spectral response, the method comprising:

obtaining configuration parameters of the audio output device, wherein the configuration parameters represent the spectral response of the audio output device;

adjusting parameters of a decoder to match the configuration parameters of the audio output device;

selectively decoding the encoded audio file in correspondence with the parameters of the decoder to provide decoded audio data; and playing the decoded audio data over the audio output device.

2. A method of operating an electronic device as defined in claim 1 further comprising combining a plurality of channels in a frequency spectrum of the encoded audio file into a single channel in the decoded audio data.

3. A method of operating an electronic device as defined in claim 1, wherein selectively decoding comprises:

limiting the decoded audio data to one or more frequency bands in a frequency spectrum of the encoded audio file; and decoding the encoded audio file for the one or more frequency bands.

4. A method of operating an electronic device as defined in claim 3 further comprising storing the decoded audio data in a predefined format, wherein the predefined format is selected form a group comprising a Motion Picture Experts Group (MPEG) layer 3 (MP3) file, an Advanced Audio Coding (AAC) file, an Advanced Audio Coding plus (AAC+) file, a Window Media Audio (WMA) file, a Waveform Audio (WAV) file, a Musical Instrument Digital Interface (MIDI) file, and an Ogg vorbis file.

5. A method of operating an electronic device as defined in claim 1 further comprising operating the electronic device in a mode selected from a group comprising a power-saving mode and a performance mode.

6. A method of operating an electronic device, the electronic device receiving an encoded audio file, the electronic device coupled to an audio output device having a spectral response, the method comprising:

combining a plurality of channels in a frequency spectrum of the encoded audio file into a single channel in decoded audio data resulting from the encoded audio file;

obtaining configuration parameters of the audio output device, wherein the configuration parameters represent a spectral response of the audio output device;

adjusting parameters of a decoder to match the configuration parameters of the audio output device;

limiting the single channel in the decoded audio data to one or more frequency bands in a frequency spectrum of the encoded audio file based on the configuration parameters of the audio output device; and decoding the encoded audio file for the one or more frequency bands.

7. A method of operating an electronic device as defined in claim 6 further comprising storing the decoded audio data in a predefined format, wherein the predefined format is selected form a group comprising a Motion Picture Experts Group (MPEG) layer 3 (MP3) file, an Advanced Audio Coding (AAC) file, an Advanced Audio Coding plus (AAC+) file, a Window Media Audio (WMA) file, a Waveform Audio (WAV) file, a Musical Instrument Digital Interface (MIDI) file, and an Ogg vorbis file.

8. A method of operating an electronic device as defined in claim 6 further comprising operating the electronic device in a mode selected from a group comprising a power saving mode and a performance mode.

9. An electronic device comprising:

an aggregator for combining a plurality of channels in a frequency spectrum of an encoded audio file into a single channel in a decoded audio data;

a storage module for storing configuration parameters of an audio output device, wherein the configuration parameters represent a spectral response of the audio output device;

a decoder for receiving the configuration parameters of the audio output device; and a filter for limiting the decoded audio data to one or more frequency bands in the frequency spectrum of the encoded audio file based on configuration parameters representing a spectral response of an audio output device coupled to the electronic device.

10. An electronic device as defined in claim 9, wherein the encoded audio file is selected from a group comprising a Motion Picture Experts Group (MPEG) layer 3 (MP3) file, an Advanced Audio Coding (AAC) file, an Advanced Audio Coding plus (AAC+) file, a Window Media Audio (WMA) file, and an Ogg vorbis file.

11. A computer program product for use with a computer, the computer program product comprising a computer storage medium having a computer readable program code embodied therein for operating an electronic device, the electronic device receiving an encoded audio file, the electronic device operably coupled to an audio output device having a spectral response, the computer readable program code performing:

combining a plurality of channels in a frequency spectrum of the encoded audio file into a single channel in the decoded audio data;

obtaining configuration parameters of the audio output device, wherein the configuration parameters represent a spectral response of the audio output device; and adjusting parameters of a decoder to match the configuration parameters of the audio output device;

limiting the single channel in the decoded audio data to one or more frequency bands in the frequency spectrum of the encoded audio file based on the configuration parameters of the audio output device; and decoding the encoded audio file for the one or more frequency bands.

* * * * *